United States Patent
Yamanaka

(10) Patent No.: US 12,337,682 B2
(45) Date of Patent: Jun. 24, 2025

(54) DRIVING ASSISTANCE DEVICE

(71) Applicant: HONDA MOTOR CO., LTD., Tokyo (JP)

(72) Inventor: Fumikage Yamanaka, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 18/582,662

(22) Filed: Feb. 21, 2024

(65) Prior Publication Data
US 2024/0326589 A1  Oct. 3, 2024

(30) Foreign Application Priority Data

Mar. 31, 2023 (CN) .......................... 202310335927.X

(51) Int. Cl.
*B60K 26/02* (2006.01)
*B60T 7/10* (2006.01)
*B60T 7/08* (2006.01)

(52) U.S. Cl.
CPC .............. *B60K 26/02* (2013.01); *B60T 7/102* (2013.01); *B60T 7/085* (2013.01); *B60T 2220/04* (2013.01)

(58) Field of Classification Search
CPC ......... B60K 26/02; B60T 7/102; B60T 7/085; B60T 2220/04; B60W 30/18181
See application file for complete search history.

(56) References Cited

U.S. PATENT DOCUMENTS

| | | | | | |
|---|---|---|---|---|---|
| 2,724,285 | A | * | 11/1955 | Lerman ................. | B60W 30/18 74/484 R |
| 2,777,335 | A | * | 1/1957 | Engberg ................ | B60W 30/18 74/486 |
| 3,373,628 | A | * | 3/1968 | Lake ..................... | B60W 30/18 74/484 R |
| 4,627,522 | A | * | 12/1986 | Ulrich ............... | B60W 30/1819 74/484 R |
| 10,175,713 | B1 | * | 1/2019 | Howell .................... | B60T 7/06 |

FOREIGN PATENT DOCUMENTS

JP  H0939600 A  2/1997
TR  200907031 A2 *  1/2011

* cited by examiner

*Primary Examiner* — Thomas C Diaz
(74) *Attorney, Agent, or Firm* — CKC & PARTNERS CO., LLC

(57) ABSTRACT

A driving assistance device includes: a first member rotatably supported by a first member rotational shaft; a second member rotatably supported by a second member rotational shaft; an operation lever rotatably supported by both a first lever rotational shaft and a second lever rotational shaft, the first lever rotational shaft being provided at the first member, the second lever rotational shaft being provided at the second member and disposed toward a front side relative to the first lever rotational shaft, the operation lever including an extension part extending from the first lever rotational shaft toward a rear side; and a transfer member driving a generator that generates at least one of braking force or drive force for the vehicle in accordance with an operation of the operation lever.

6 Claims, 17 Drawing Sheets

DRIVING ASSISTANCE DEVICE

This application is based on and claims the benefit of priority from Chinese Patent application No. CN202310335927.X filed on Mar. 31, 2023, the content of which is incorporated herein by reference.

BACKGROUND OF THE INVENTION

Field of the Invention

The present disclosure relates to a driving assistance device.

Related Art

Conventionally, a driving assistance device suitable for driving by a physically handicapped person has been attached to an automobile for a nonhandicapped person. For example, Japanese Unexamined Patent Application, Publication No. H9-39600 discloses a vehicle for a physically handicapped person in which a brake pedal and an acceleration pedal are operated by means of an operation lever that is manually operated.

Patent Document 1: Japanese Unexamined Patent Application, Publication No. H9-39600

SUMMARY OF THE INVENTION

However, in the conventional driving assistance device as disclosed in Japanese Unexamined Patent Application, Publication No. H9-39600, the operation lever is supported on a floor between a driver seat and a front passenger seat. Thus, in the vehicle for a physically handicapped person in which the conventional driving assistance device is provided, the operation lever interferes with side walk-through, i.e., movement of a person between the driver seat and the front passenger seat.

Furthermore, since a support point of the operation lever is provided on the floor, a distance to the operation lever is long, and thus in operation of pushing the operation lever toward the front side of the vehicle, the driver stretches their arm so that a shoulder position (shoulder point) is potentially separated from the driver seat. In a case where the driver has a disability of the lower half of their body, the driver sits in a driving posture with the upper half of their body pushed against the driver seat, and it is difficult for the driver to maintain this posture when the shoulder position is separated from the driver seat.

This problem can be solved by decreasing an amount by which the operation lever is pushed (by narrowing an operation range). However, in a case where the operation range is narrowed, acceleration and deceleration need to be controlled in the reduced operation range and reaction to acceleration and deceleration operations becomes too sensitive, which makes it difficult to perform fine adjustment. Thus, it has been difficult to optimize an amount of an operation and fine adjustment of an operation.

The present disclosure is intended to provide a driving assistance device that does not interfere with side walk-through and with which the amount of an operation and fine adjustment of an operation can be easily optimized.

The present disclosure solves the problem by the following means for solution. Reference signs corresponding to an embodiment of the present disclosure are attached in description to facilitate understanding, but the present disclosure is not limited thereto.

A first disclosure is directed to a driving assistance device (1) including: a first member (40) rotatably supported by a first member rotational shaft (41); a second member (50) rotatably supported by a second member rotational shaft (51); an operation lever (60) rotatably supported by both a first lever rotational shaft (42) and a second lever rotational shaft (52), the first lever rotational shaft (42) being provided at the first member (40), the second lever rotational shaft (52) being provided at the second member (50) and disposed toward a front side of a vehicle relative to the first lever rotational shaft (42), the operation lever (60) including an extension part (62) extending from the first lever rotational shaft (42) toward a rear side of the vehicle; and a transfer member (50, 70) that drives a generator (20, 90) that generates at least one of braking force or drive force for the vehicle in accordance with an operation of the operation lever (60).

A second disclosure is directed to the driving assistance device (1) according to the first disclosure, in which the first member rotational shaft (41) and the second member rotational shaft (51) are provided at the same member.

A third disclosure is directed to the driving assistance device (1) according to the first disclosure or the second disclosure, in which the generator (20, 90) is at least one selected from an acceleration pedal (30), an acceleration sensor part (90), a brake pedal (20), and a brake sensor.

A fourth disclosure is directed to the driving assistance device (1) according to the third disclosure, in which the transfer member includes a first transfer member (70) that drives a braking force generator (20) that generates the braking force, and a second transfer member (50) that drives a drive force generator (90) that generates the drive force, the first transfer member (70) is rotatably supported by a transfer rotational shaft (71), and the second transfer member (50) is the second member (50) that drives the acceleration sensor part (90).

A fifth disclosure is directed to the driving assistance device (1) according to the fourth disclosure, further including a third member (80) rotatably supported by a third lever rotational shaft (43) provided at the first member (40), the third member (80) configured to come into contact with the transfer member (70).

A sixth disclosure is directed to the driving assistance device (1) according to the fifth disclosure, in which the third member (80) includes a first contact part (81) that comes into contact with the transfer member (70) when the operation lever (60) is operated by an operation amount equal to or smaller than a first operation amount, and a second contact part (82) that comes into contact with the transfer member (70) when the operation lever (60) is operated by an operation amount larger than the first operation amount, and the second contact part (82) is disposed at a position closer to the transfer rotational shaft (71) than the first contact part (81).

According to the present disclosure, it is possible to provide a driving assistance device that does not interfere with side walk-through and with which the amount of an operation and fine adjustment of an operation can be easily optimized.

DETAILED DESCRIPTION OF THE INVENTION

An embodiment of the present disclosure will be described below with reference to the accompanying drawings and the like.

Embodiment

Figure 1:
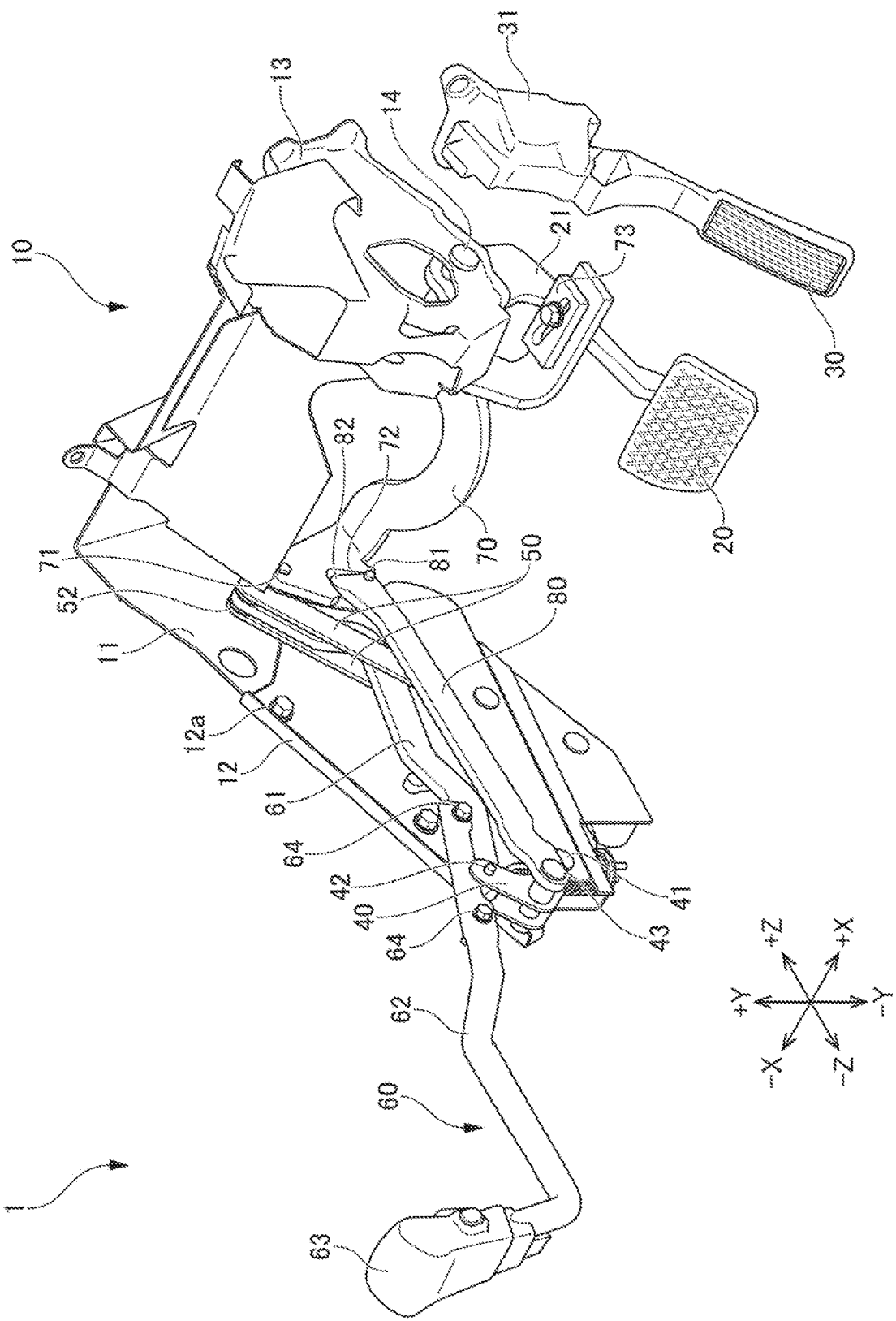
FIG. 1 is a perspective view illustrating a neutral state of a driving assistance device 1 of the present embodiment.
Figure 2:
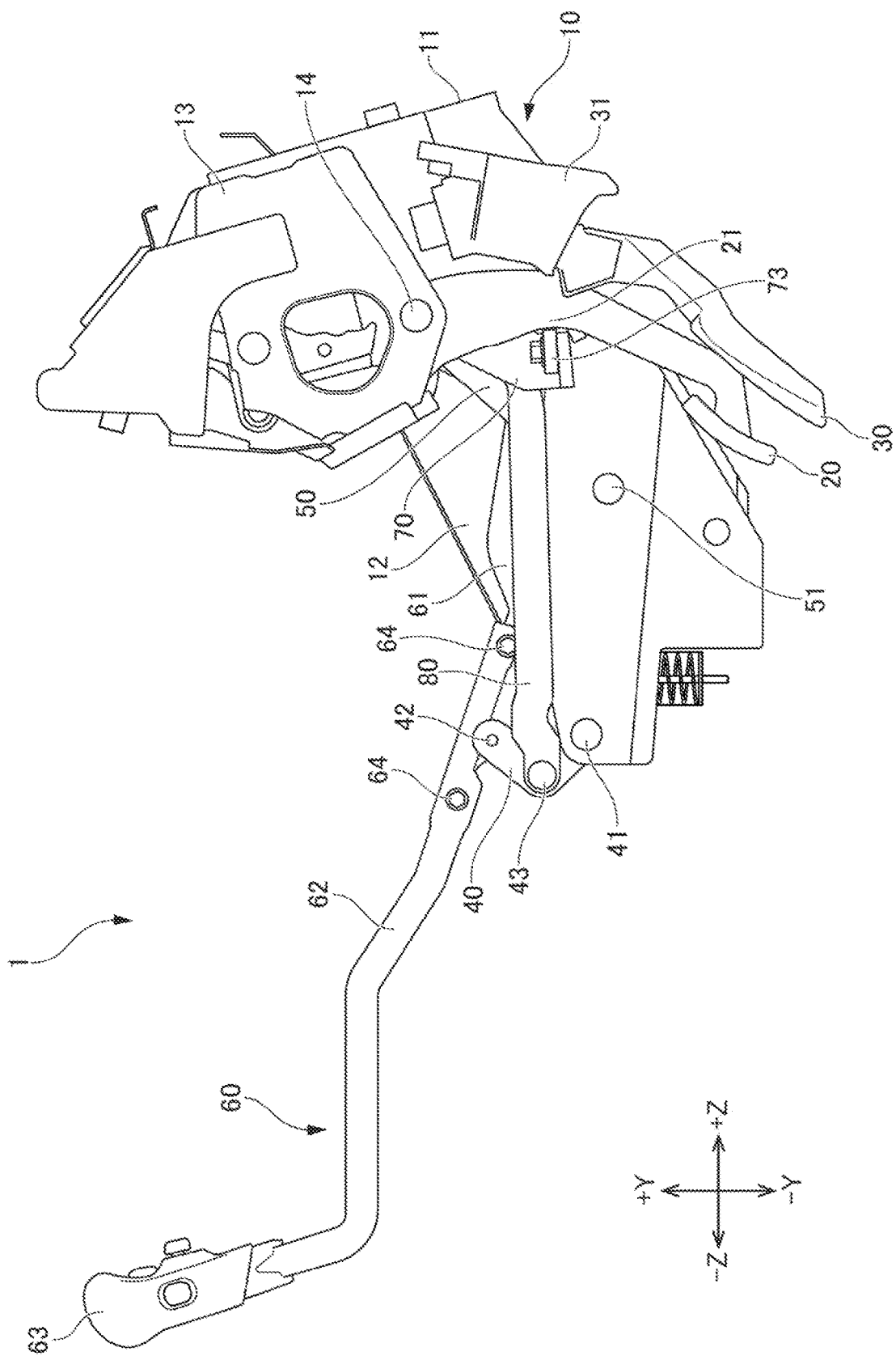
FIG. 2 is a side view illustrating the driving assistance device 1 in the neutral state.
Figure 3:
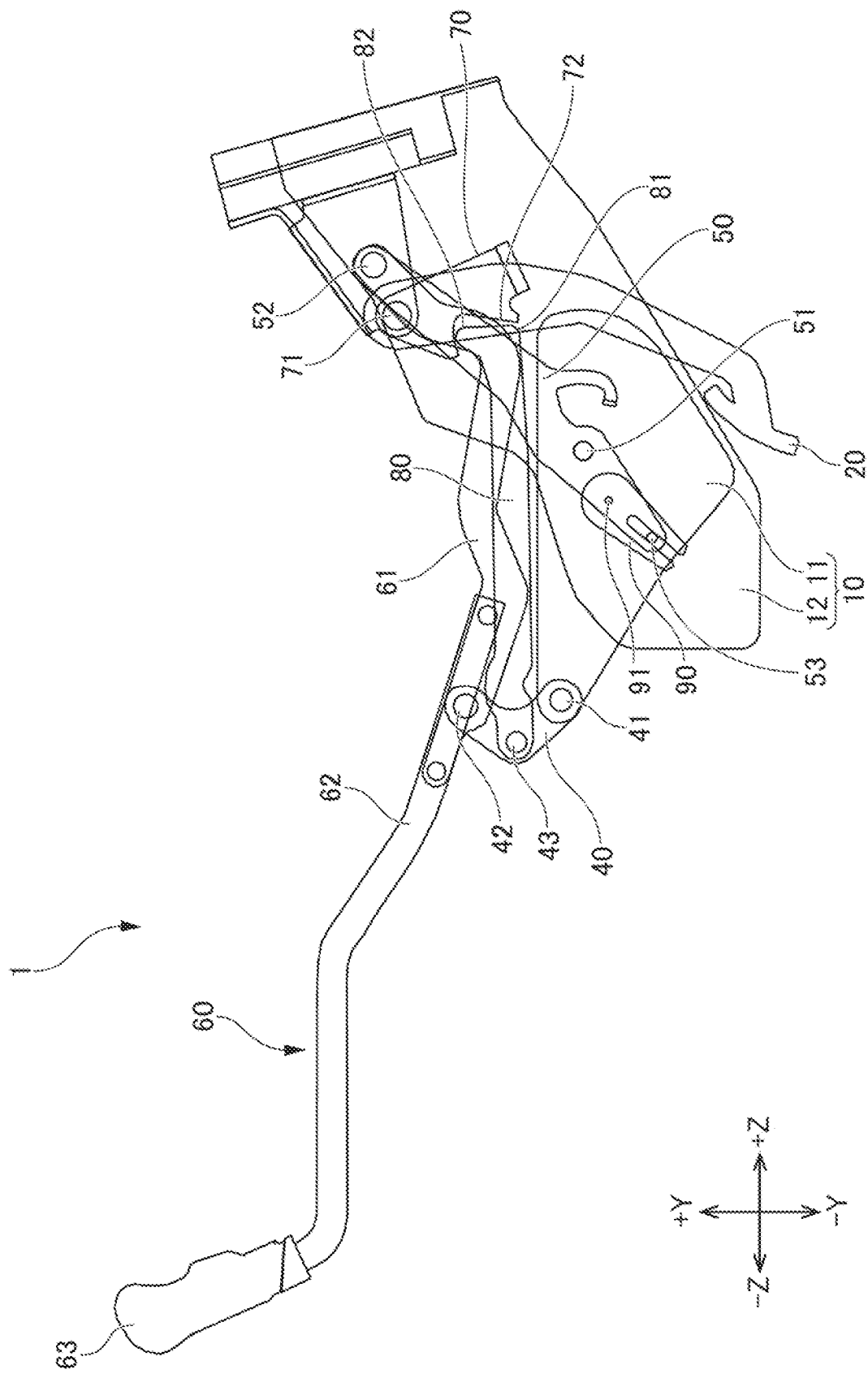
FIG. 3 is a side view illustrating main components of the driving assistance device 1 in the neutral state.
Figure 4:
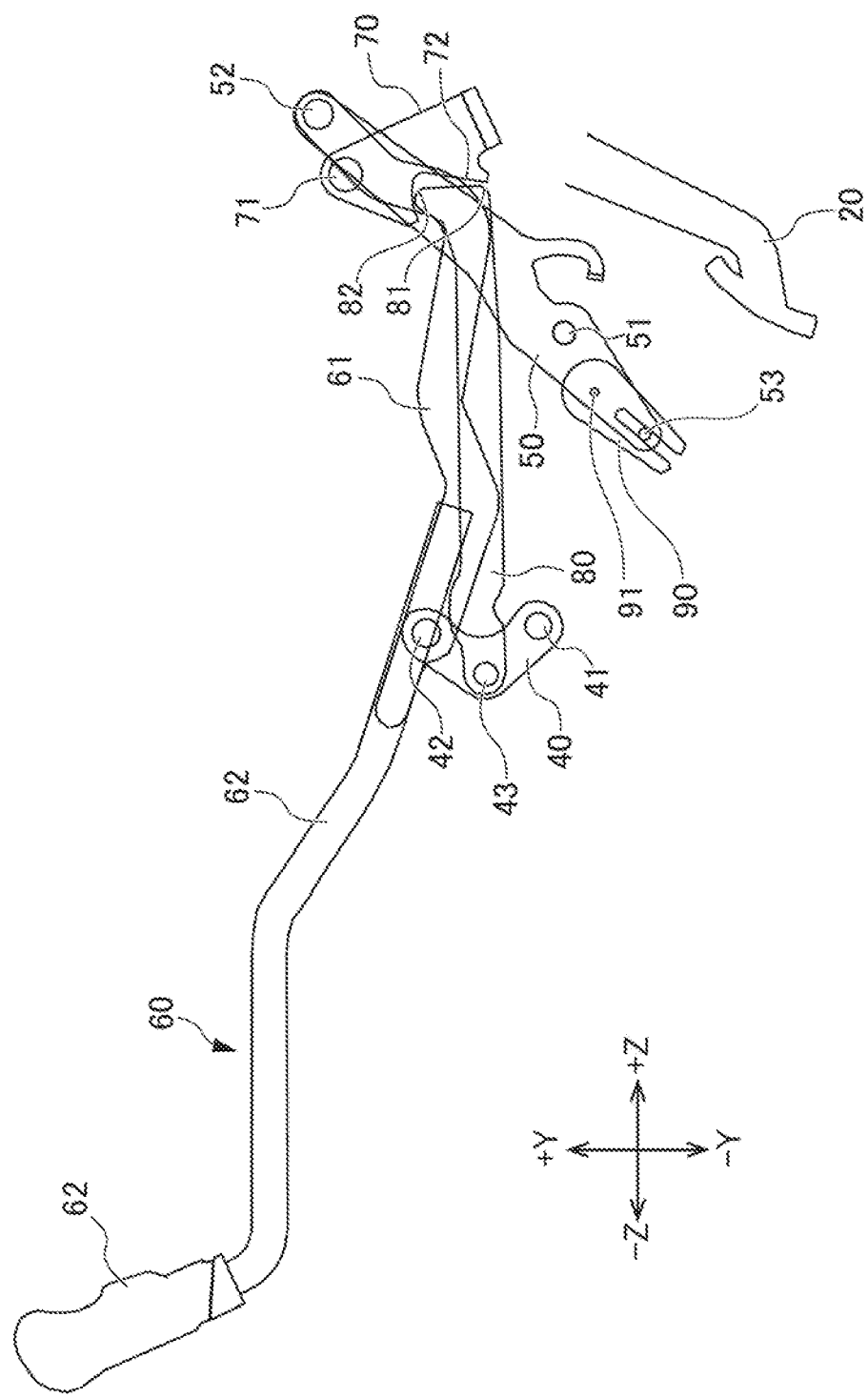
FIG. 4 is a side view illustrating movable members of the driving assistance device 1 in the neutral state.
Figure 5:
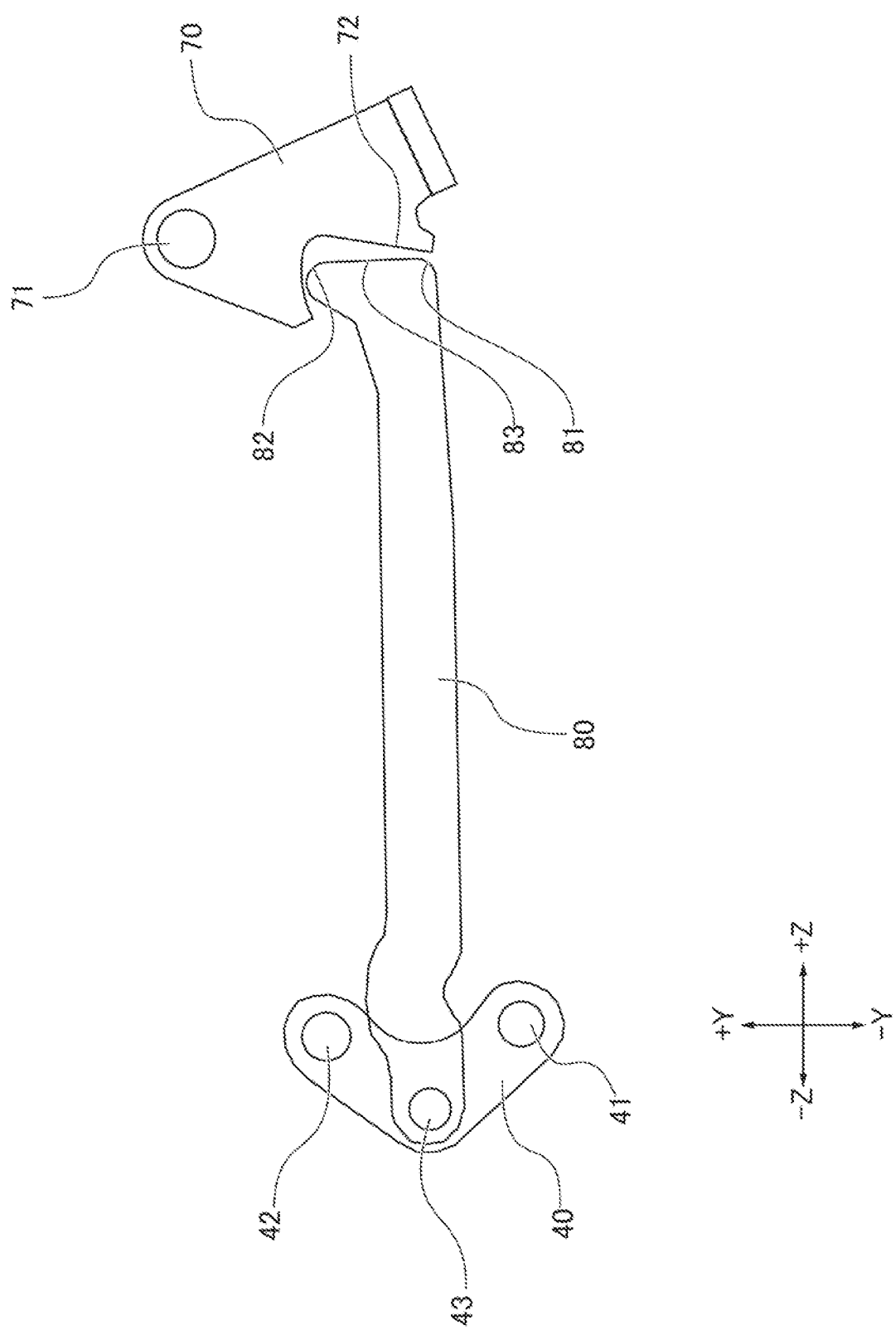
FIG. 5 is an enlarged view illustrating a first member 40, a third member 80, and a transfer member 70 in the neutral state.

FIG. 1 is a perspective view illustrating a neutral state of a driving assistance device 1 of the present embodiment. FIG. 2 is a side view illustrating the driving assistance device 1 in the neutral state. FIG. 3 is a side view illustrating main components of the driving assistance device 1 in the neutral state. FIG. 4 is a side view illustrating movable members of the driving assistance device 1 in the neutral state. FIG. 5 is an enlarged view illustrating a first member 40, a third member 80, and a transfer member 70 in the neutral state. FIGS. 3 to 5 and FIG. 6 and any subsequent drawing to be described below transparently illustrate a shape of a main part of each movable member in an overlapping manner. Each drawing is a schematically illustrated diagram and, a size and a shape of each component are exaggerated and omitted as appropriate to facilitate understanding. For convenience of description, X, Y, and Z orthogonal coordinates are provided in the drawings and used in the following description to explain an orientation of each component and the like. An X-axis direction is defined to be a right-left direction with +X and −X on a right side (right side when viewed from a driver) and a left side, respectively, of a vehicle (not illustrated) to which the driving assistance device 1 is attached. A Z-axis direction is defined to be a front-rear direction with +Z and −Z on front and rear sides of the vehicle, respectively. A Y-axis direction is defined to be an up-down direction with +Y and −Y on up and down sides of the vehicle, respectively.

The driving assistance device 1 of the present embodiment is a device that is additionally attached to a vehicle for a nonhandicapped person and allows a physically handicapped person to perform brake and acceleration operations of the vehicle through operations with a hand. With the driving assistance device 1 of the present embodiment, a brake operation is performed when an operation lever 60 to be described later is operated substantially in the front direction (+Z direction), and an acceleration operation is performed when the operation lever 60 is operated substantially in the rear direction (−Z direction). In the following description, the neutral state is a state in which the operation lever 60 is located at a position where no brake operation nor acceleration operation is performed. In the present embodiment, a configuration for a right-hand-drive car will be exemplarily described, but each component may be inverted in the right-left direction to achieve a configuration for a left-hand-drive car.

The driving assistance device 1 includes a base part 10, a brake pedal 20, an acceleration pedal 30, the first member 40, a second member 50, the operation lever 60, the transfer member 70, and the third member 80. Each main member included in the driving assistance device 1 is made of metal but is not limited thereto.

The base part 10 includes a partition member 11, a support member 12, and a pedal support member 13 and is a base part of the driving assistance device 1. The base part 10 is attached to a side surface of a center cluster and a dashboard and desirably disposed toward the front side relative to a surface (surface on the rear side and on a side facing the driver) of the center cluster. The partition member 11 is fixed to a chassis (not illustrated) of the vehicle.

The support member 12 includes shafts and the like necessary for attaching the driving assistance device 1 and is a member additionally attached to the partition member 11. The support member 12 is fixed to the partition member 11 by fastening members 12a and the like such as bolts and nuts. The support member 12 includes a first member rotational shaft 41, a second member rotational shaft 51, and a transfer rotational shaft 71. The first member rotational shaft 41 has a central axis aligned with the X-axis direction near an end part of the support member 12 on the rear side (−Z side) of the vehicle. The second member rotational shaft 51 has a central axis aligned with the X-axis direction on the front side (+Z side) of the vehicle relative to the first member rotational shaft 41. The transfer rotational shaft 71 has a central axis aligned with the X-axis direction and positioned toward the front side (+Z side) of the vehicle relative to the first member rotational shaft 41 and the second member rotational shaft 51. The transfer rotational shaft 71 is provided at a position where the transfer rotational shaft 71 is coaxial with a pedal shaft 14 supporting the brake pedal 20. Since the transfer rotational shaft 71 and the pedal shaft 14 are provided at such coaxial positions, the transfer member 70 and the brake pedal 20 have identical loci of rotation movement at a position where the transfer member 70 pushes the brake pedal 20. Thus, smooth actuation can be performed without providing an additional component such as a roller at the position where the transfer member 70 pushes the brake pedal 20.

The pedal support member 13 is integrally attached to the partition member 11 by a non-illustrated fastening member or the like and rotatably supports the brake pedal 20 about a center at the pedal shaft 14. The partition member 11 and the pedal support member 13 are members used with the same configuration also in a vehicle for a nonhandicapped person in which the driving assistance device 1 is not attached.

The brake pedal 20 is rotatably attached about the pedal shaft 14 provided at the pedal support member 13. The brake pedal 20 is a member used with the same configuration also in a vehicle for a nonhandicapped person. In the present embodiment, the brake pedal 20 is a braking force generator (generator) that generates braking force.

The acceleration pedal 30 is disposed side by side with the brake pedal 20 and rotatably supported by a pedal side acceleration sensor part 31. The pedal side acceleration sensor part 31 is fixed to the chassis of the vehicle or the like, detects an operation amount of the acceleration pedal 30, and transfers the detected operation amount to a control unit of the vehicle.

With this configuration, even in a vehicle to which the driving assistance device 1 of the present embodiment is attached, an acceleration operation and a brake operation can be performed as in a vehicle for a nonhandicapped person by operating the brake pedal 20 and the acceleration pedal 30 described above with a foot.

The first member 40 is rotatably supported by the first member rotational shaft 41 provided at the base part 10. Accordingly, the first member 40 can perform rotation movement about the first member rotational shaft 41. The first member 40 is formed of a substantially L-shaped plate member in a side view such as FIG. 3 or 4 from the +X side. The specific shape of the first member 40 is not limited to a substantially L-shaped plate member described above. The first member rotational shaft 41 is provided on one end side of the first member 40. The first member 40 includes a first lever rotational shaft 42 and a third lever rotational shaft 43 at positions separated from the position of the first member rotational shaft 41. The first lever rotational shaft 42 is provided on the other end side opposite the first member rotational shaft 41 of the first member 40. The third lever rotational shaft 43 is provided at a part where the first member 40 bends between the first member rotational shaft 41 and the first lever rotational shaft 42. The first lever rotational shaft 42 and the third lever rotational shaft 43 each have a central axis aligned with the X-axis direction.

The second member 50 is rotatably supported by the second member rotational shaft 51 provided at the base part 10. The second member 50 extends from the position of the second member rotational shaft 51 toward substantially the front side (+Z side) of the vehicle in the neutral state illustrated in FIGS. 1 to 4. The second member 50 includes a second lever rotational shaft 52 near an end part separated from the second member rotational shaft 51. The second lever rotational shaft 52 is disposed toward the front side (+Z side) of the vehicle relative to the first lever rotational shaft 42 and has a central axis aligned with the X-axis direction. The second member 50 also includes a pin-shaped acceleration operation part 53 protruding in the X-axis direction. The acceleration operation part 53 engages with an acceleration sensor part 90 rotatably provided about a rotational shaft 91. Accordingly, the second member 50 also functions as a second transfer member that drives the acceleration sensor part 90.

The operation lever 60 includes an operation lever body part 61, an extension part 62, and a grasping part 63. The operation lever body part 61 is rotatably supported by both the first lever rotational shaft 42 provided at the first member 40 and the second lever rotational shaft 52 provided at the second member 50 and is a substantially plate part extending between the first lever rotational shaft 42 and the second lever rotational shaft 52. The extension part 62 is a hollow member fixed to the operation lever body part 61 by a fastening member 64. The fastening member 64 is omitted in FIG. 3 and any subsequent drawing. The extension part 62 extends from the first lever rotational shaft 42 toward the rear side (−Z side) of the vehicle up to a position where a hand of the driver sitting on the driver seat is naturally put. The grasping part 63 is provided at an end part of the extension part 62 on the rear side (−Z side) of the vehicle and is a part grasped by the hand of the driver. For example, a lighting switch, a horn switch, and a turn signal switch may be provided at the grasping part 63 although detailed description thereof is omitted.

The transfer member (first transfer member) 70 is rotatably supported by the transfer rotational shaft 71 provided at the base part 10 and extends substantially in the X-axis direction from the transfer rotational shaft 71 to the brake pedal 20. The transfer member 70 includes an input part 72 and a pedal pushing part 73. The input part 72 is disposed near the transfer rotational shaft 71 and receives pushing force toward the front side (+Z side) of the vehicle from the third member 80, which will be described later, being actuated in accordance with an operation of the operation lever 60, and accordingly, the transfer member 70 is rotated by the pushing force. The pedal pushing part 73 is attached to a position that comes into contact with an arm part 21 of the brake pedal 20. As the transfer member 70 receives and is rotated by the pushing force from the third member 80, the pedal pushing part 73 pushes the arm part 21 of the brake pedal 20 toward the front side (+Z side) of the vehicle and actuates the brake of the vehicle. The pedal pushing part 73 is attached such that its position of fixation to the transfer member 70 can be adjusted, and thus the degree of contact with the arm part 21 of the brake pedal 20 can be adjusted.

The third member 80 is rotatably supported by the third lever rotational shaft 43 provided at the first member 40. The third member 80 extends from the third lever rotational shaft 43 toward substantially the front side (+Z side) of the vehicle up to a position that can come into contact with the input part 72 of the transfer member 70. The third member 80 includes a first contact part 81 and a second contact part 82 on the front side (+Z side) of the vehicle in the vicinity of the input part 72 of the transfer member 70. Contact surfaces of the first contact part 81 and the second contact part 82, which come into contact with the input part 72, are both cylindrical surfaces. The first contact part 81 comes into contact with the input part 72 of the transfer member 70 when the operation lever 60 is operated toward the front side (+Z side) of the vehicle by an operation amount equal to or smaller than a first operation amount. The second contact part 82 is disposed at a position closer to the transfer rotational shaft 71 than the first contact part 81. The second contact part 82 comes into contact with the input part 72 of the transfer member 70 when the operation lever 60 is operated toward the front side (+Z side) of the vehicle by an operation amount larger than the first operation amount.

In a case of a light brake operation, it is often better in terms of operability to facilitate subtle adjustment of brake force than to increase brake force. Thus, in such a situation, the first contact part 81 is made to contact with a position separated from the transfer rotational shaft 71 as the rotation center of the transfer member 70, thereby ensuring a long operation stroke with priority on operability.

However, in a case of a strong brake operation, such as a situation of hard braking, it is important that braking swiftly works. Thus, in such a situation, the second contact part 82 is made to contact with a position close to the transfer rotational shaft 71 as the rotation center of the transfer member 70, thereby shortening the operation stroke so that braking more swiftly works. Moreover, since the second contact part 82 is made to contact with a position close to the transfer rotational shaft 71, reaction force against force that pushes the operation lever 60 increases and it can be felt by a hand that stronger braking works.

The first operation amount can be set as appropriate and may be an operation amount corresponding to a brake state that is intermediate between a light brake state in which braking starts working and a full brake state (in the present embodiment, an operation amount corresponding to an intermediate brake state to be described later). In the neutral state, the first contact part 81 and the second contact part 82 are not in contact with the input part 72 of the transfer member 70.

If a site that is in contact with the input part 72 of the transfer member 70 abruptly switches from the first contact part 81 to the second contact part 82, it is possible that discomfort is felt at an operation or the work of braking abruptly changes. Thus, in the present embodiment, a curved surface part 83 (refer to FIG. 5) that smoothly connects the first contact part 81 and the second contact part 82 is provided so that the site that is in contact with the input part 72 of the transfer member 70 gradually changes from the first contact part 81 to the second contact part 82.

The operation of the driving assistance device 1 will be described below. As described above, with the driving assistance device 1, a brake operation is performed when the operation lever 60 is operated substantially in the front direction (+Z direction). In the driving assistance device 1 of the present embodiment, the brake pedal 20 is actuated with operation force on the operation lever 60 at a brake operation through the first member 40, the second member 50, the third member 80, the transfer member 70, and the like in cooperation. The following describes operation in each of the light brake state, the intermediate brake state, a strong brake state, the full brake state, and a full acceleration state in ascending order of the operation amount of the operation lever 60 on a brake side (the front side (+Z side) of the vehicle).

(Light Brake State)

Figure 6:
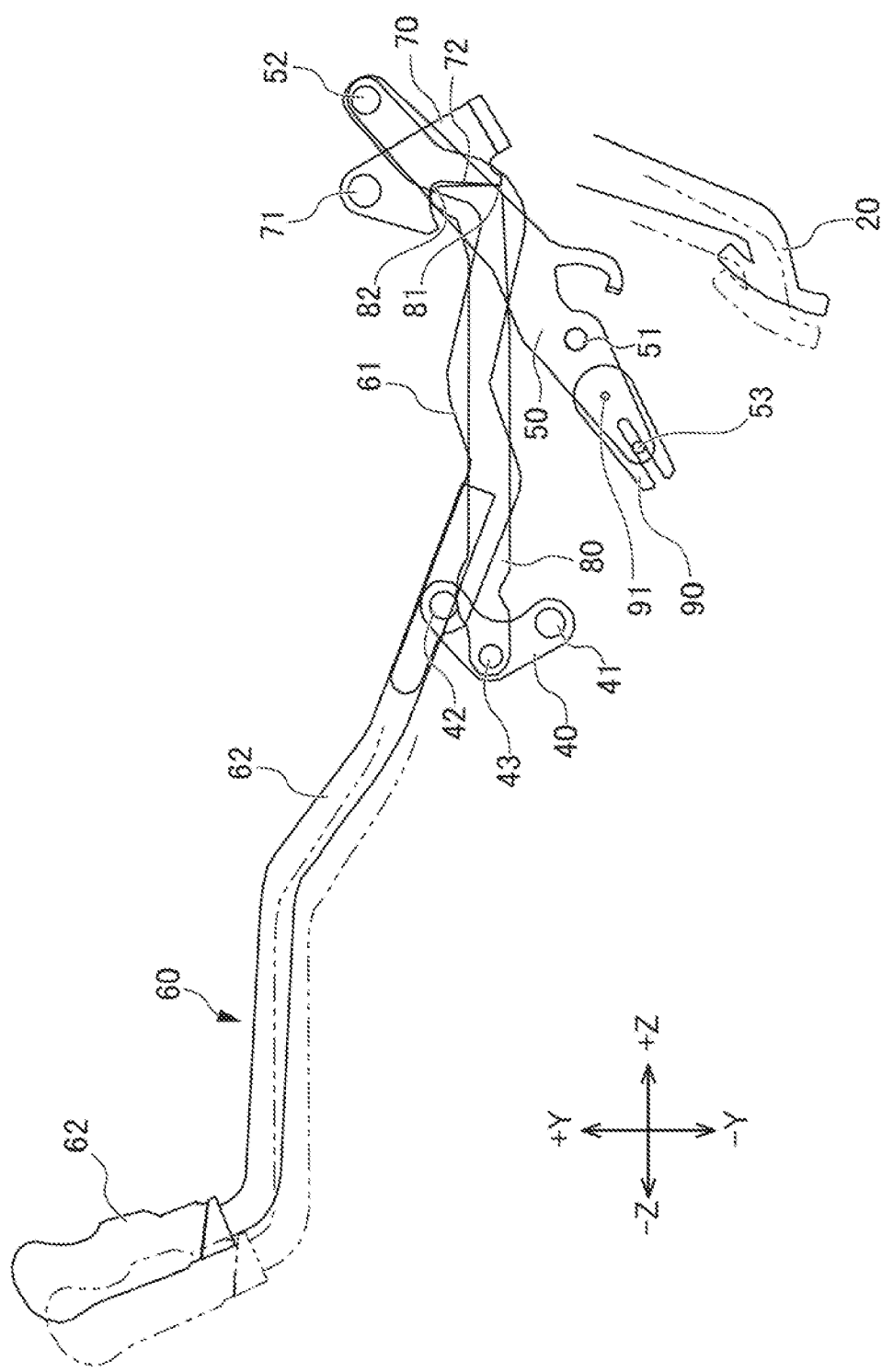
FIG. 6 is a side view illustrating the movable members of the driving assistance device 1 in a light brake state.
Figure 7:
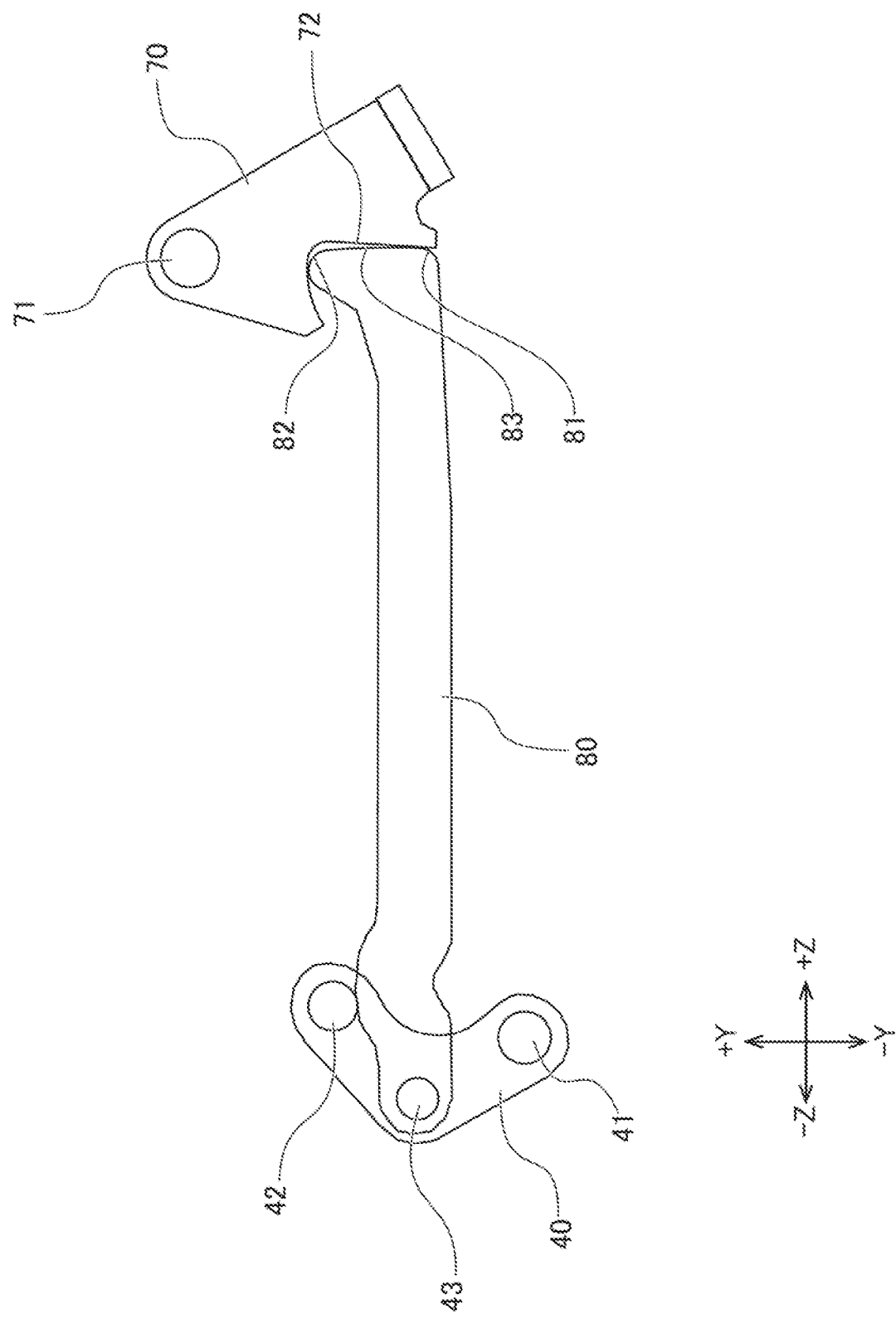
FIG. 7 is an enlarged view illustrating the first member 40, the third member 80, and the transfer member 70 in the light brake state.

FIG. 6 is a side view illustrating the movable members of the driving assistance device 1 in the light brake state. FIG. 7 is an enlarged view illustrating the first member 40, the third member 80, and the transfer member 70 in the light brake state. In FIG. 6 and FIGS. 8, 10, and 12 to be described later, the positions of the operation lever 60 and the brake pedal 20 in the neutral state are illustrated with dashed and double-dotted lines. When the operation lever 60 is operated substantially in the front direction (+Z direction) in the neutral state, the operation lever 60, the first member 40, and the second member 50 each rotate through a link mechanism thereof to achieve the light brake state illustrated in FIGS. 6 and 7. In the light brake state, the position of the first lever rotational shaft 42 of the first member 40 moves further toward the front side (+Z direction) of the vehicle than in the neutral state, and accordingly, the position of the third member 80 moves further toward the front side (+Z direction) of the vehicle than in the neutral state, as well. As a result, the first contact part 81 of the third member 80 comes into contact with the input part 72 of the transfer member 70 and pushes the transfer member 70 toward the front side (+Z direction) of the vehicle. With this pushing force, the transfer member 70 rotates leftward in FIGS. 6 and 7 and pushes the brake pedal 20, and accordingly, light braking is actuated.

(Intermediate Brake State)

Figure 8:
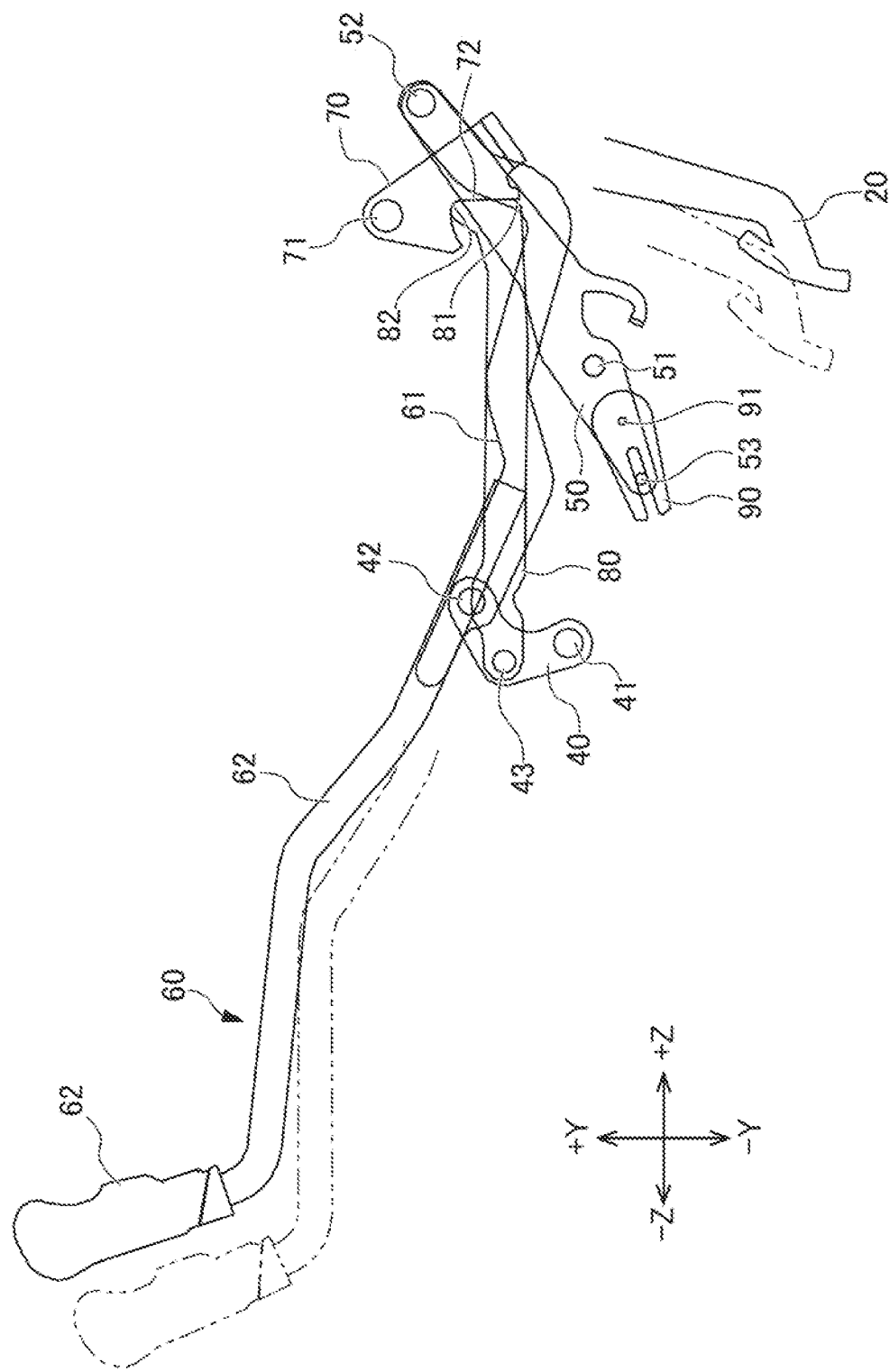
FIG. 8 is a side view illustrating the movable members of the driving assistance device 1 in an intermediate brake state.
Figure 9:
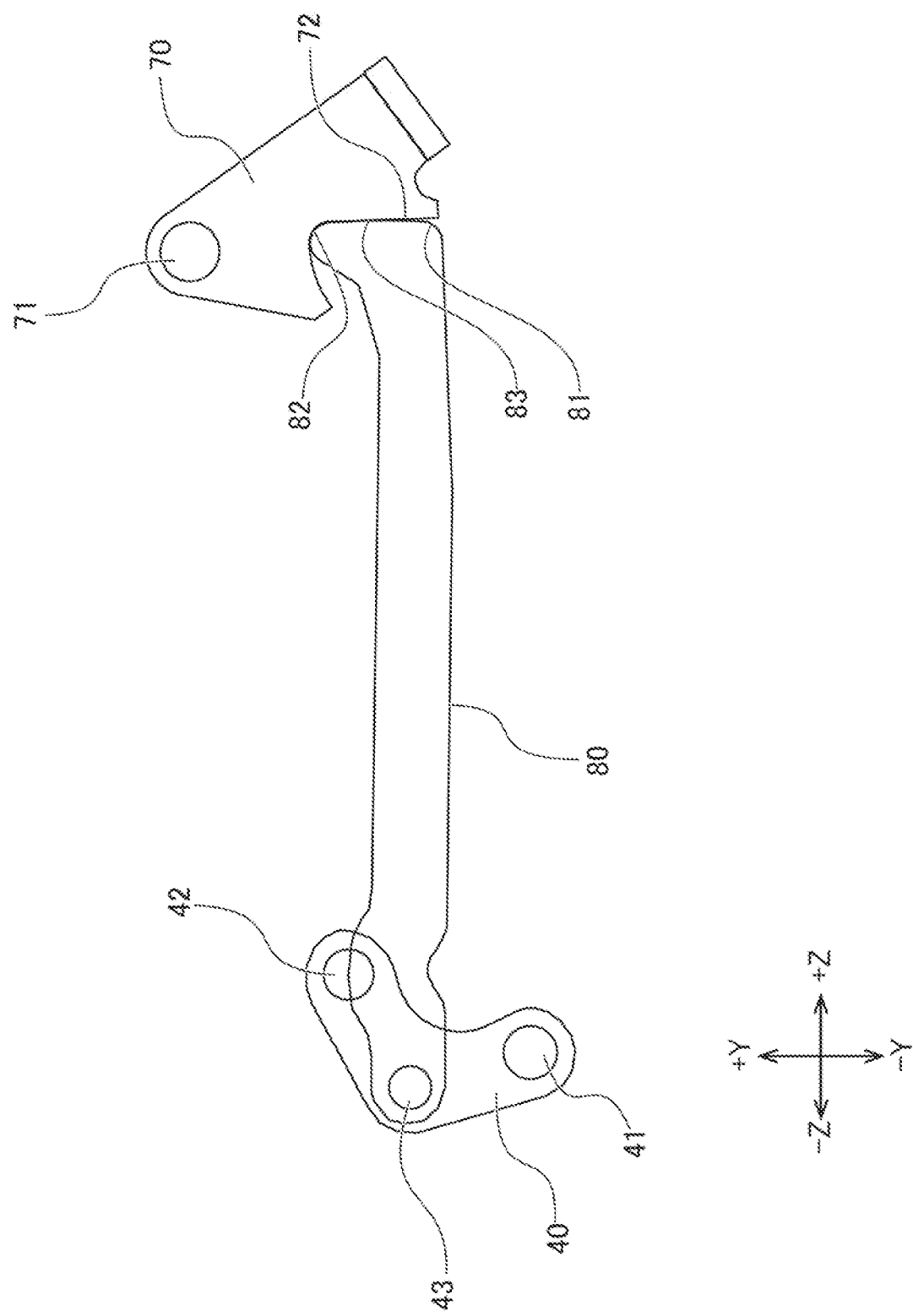
FIG. 9 is an enlarged view illustrating the first member 40, the third member 80, and the transfer member 70 in the intermediate brake state.

FIG. 8 is a side view illustrating the movable members of the driving assistance device 1 in the intermediate brake state. FIG. 9 is an enlarged view illustrating the first member 40, the third member 80, and the transfer member 70 in the intermediate brake state. When the operation lever 60 is further operated substantially in the front direction (+Z direction) in the light brake state, the operation lever 60, the first member 40, and the second member 50 each rotate through the link mechanism thereof to achieve the intermediate brake state illustrated in FIGS. 8 and 9. In the intermediate brake state, the position of the first lever rotational shaft 42 of the first member 40 moves further toward the front side (+Z direction) of the vehicle than in the light brake state, and accordingly, the position of the third member 80 moves further toward the front side (+Z direction) of the vehicle than in the light brake state, as well. As a result, the curved surface part 83 of the third member 80 comes into contact with the input part 72 of the transfer member 70 and pushes the transfer member 70 toward the front side (+Z direction) of the vehicle. With this pushing force, the transfer member 70 rotates leftward in FIGS. 8 and 9 and pushes the brake pedal 20, and accordingly, intermediate braking is actuated. At transition from the light brake state to the intermediate brake state, the site that pushes the input part 72 of the transfer member 70 switches from the first contact part 81 to the curved surface part 83. Since the curved surface part has a cylindrical surface that is smoothly connected to the first contact part 81, discomfort is not felt at an operation nor the work of braking does not abruptly change when the site that is in contact with the input part 72 of the transfer member 70 switches from the first contact part 81 to the curved surface part 83.

(Strong Brake State)

Figure 10:
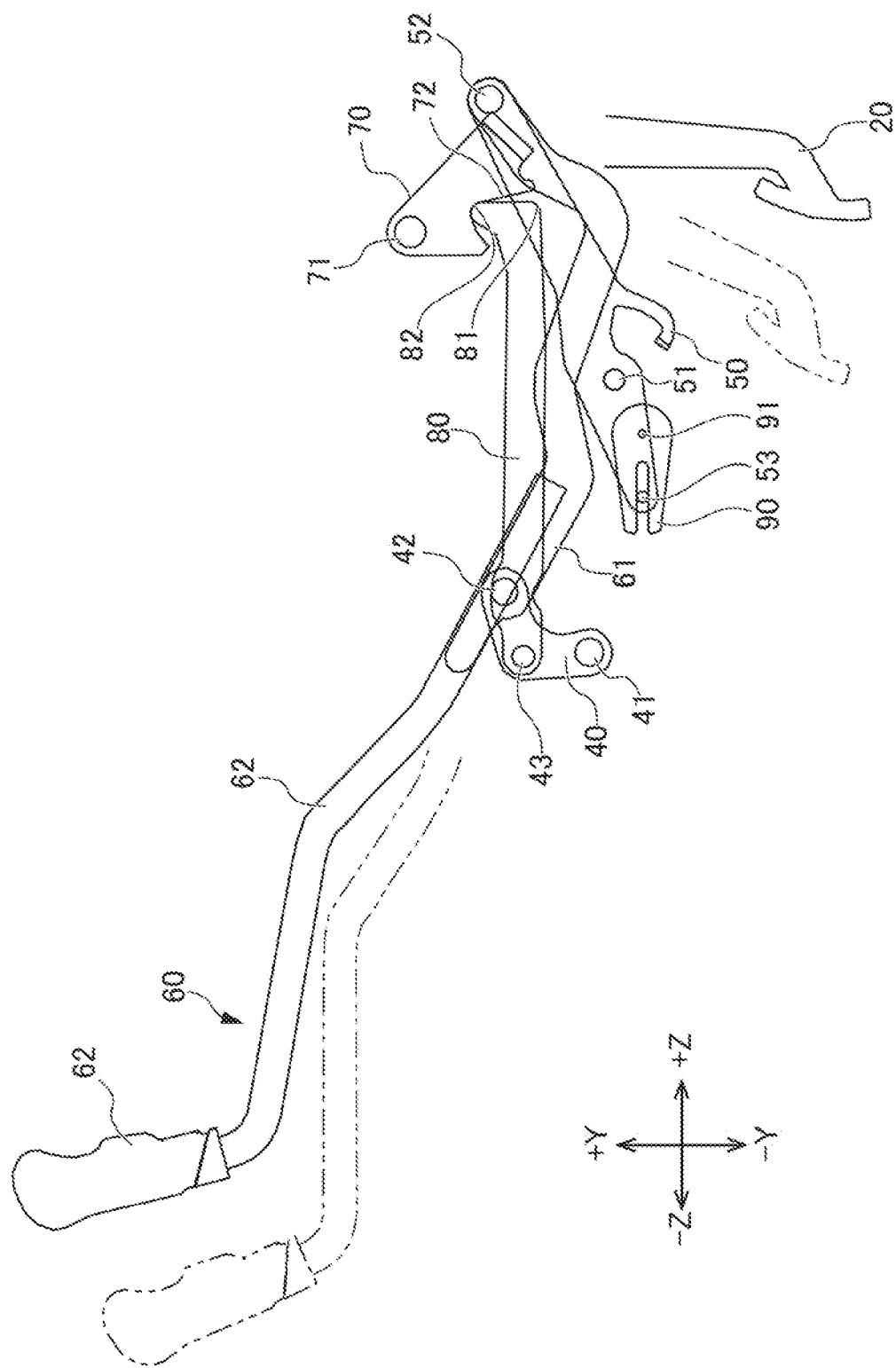
FIG. 10 is a side view illustrating the movable members of the driving assistance device 1 in a strong brake state.
Figure 11:
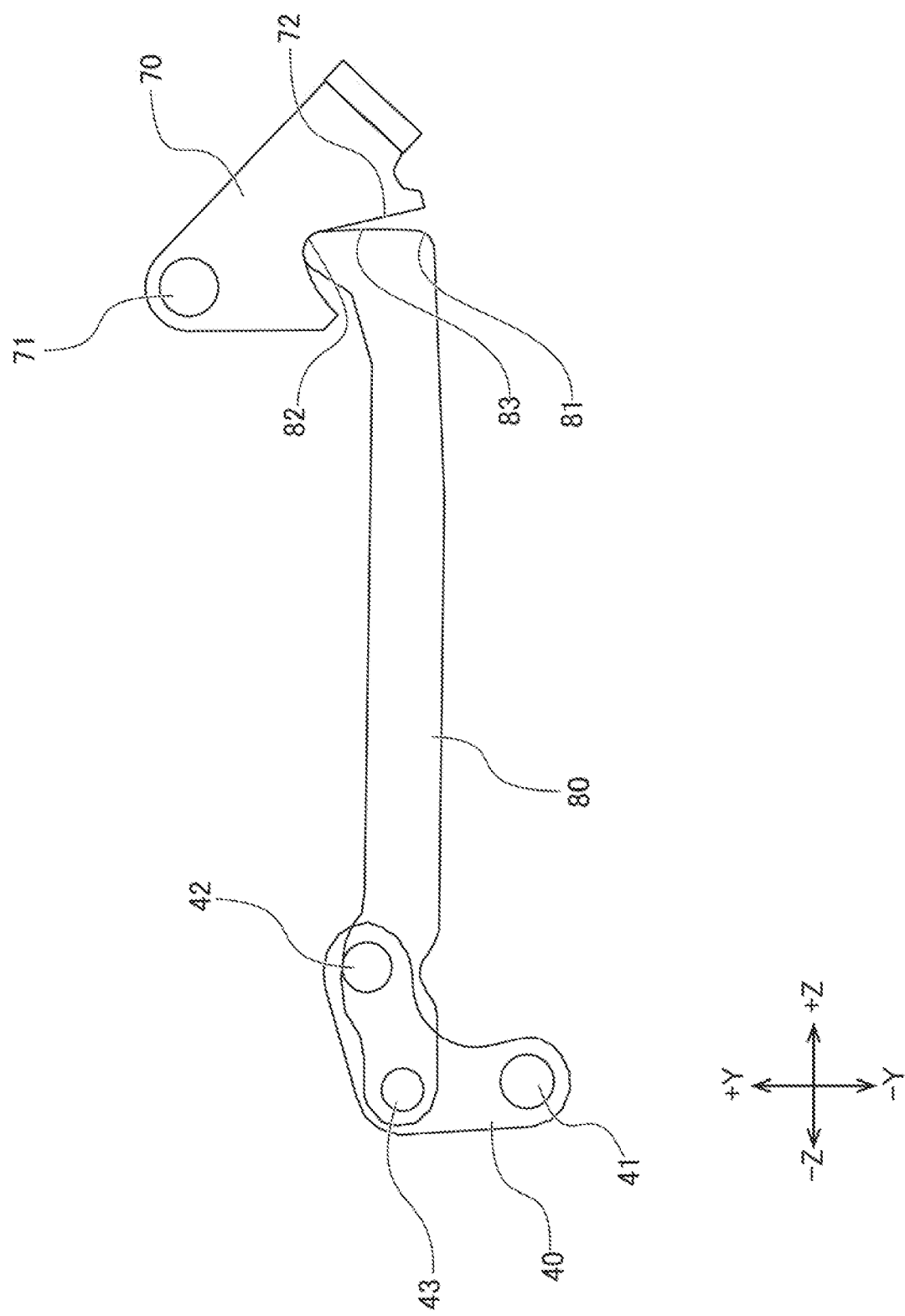
FIG. 11 is an enlarged view illustrating the first member 40, the third member 80, and the transfer member 70 in the strong brake state.

FIG. 10 is a side view illustrating the movable members of the driving assistance device 1 in the strong brake state. FIG. 11 is an enlarged view illustrating the first member 40, the third member 80, and the transfer member 70 in the strong brake state. When the operation lever 60 is further operated substantially in the front direction (+Z direction) in the intermediate brake state, the operation lever 60, the first member 40, and the second member 50 each rotate through the link mechanism thereof to achieve the strong brake state illustrated in FIGS. 10 and 11. In the strong brake state, the position of the first lever rotational shaft 42 of the first member 40 moves further toward the front side (+Z direction) of the vehicle than in the intermediate brake state, and accordingly, the position of the third member 80 moves further toward the front side (+Z direction) of the vehicle than in the intermediate brake state, as well. As a result, the second contact part 82 of the third member 80 comes into contact with the input part 72 of the transfer member 70 and pushes the transfer member 70 toward the front side (+Z direction) of the vehicle. With this pushing force, the transfer member 70 rotates leftward in FIGS. 10 and 11 and pushes the brake pedal 20, and accordingly, strong braking is actuated. At transition from the intermediate brake state to the strong brake state, the site that pushes the input part 72 of the transfer member 70 switches from the curved surface part 83 to the second contact part 82. Since the curved surface part has a cylindrical surface smoothly connected to the second contact part 82, discomfort is not felt at an operation nor the work of braking does not abruptly change when the site that is in contact with the input part 72 of the transfer member 70 switches from the curved surface part 83 to the second contact part 82.

(Full Brake State)

Figure 12:
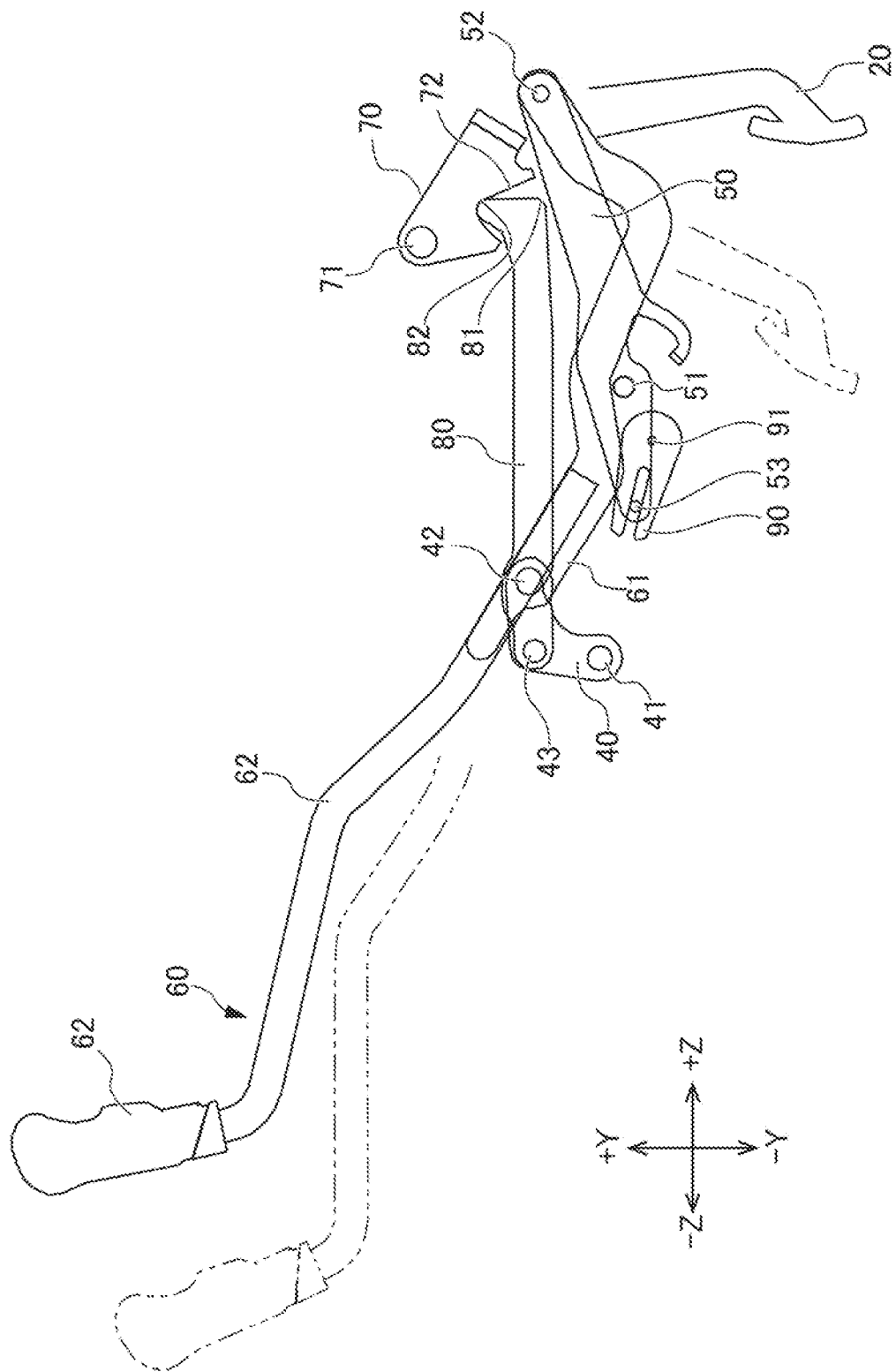
FIG. 12 is a side view illustrating the movable members of the driving assistance device 1 in a full brake state.
Figure 13:
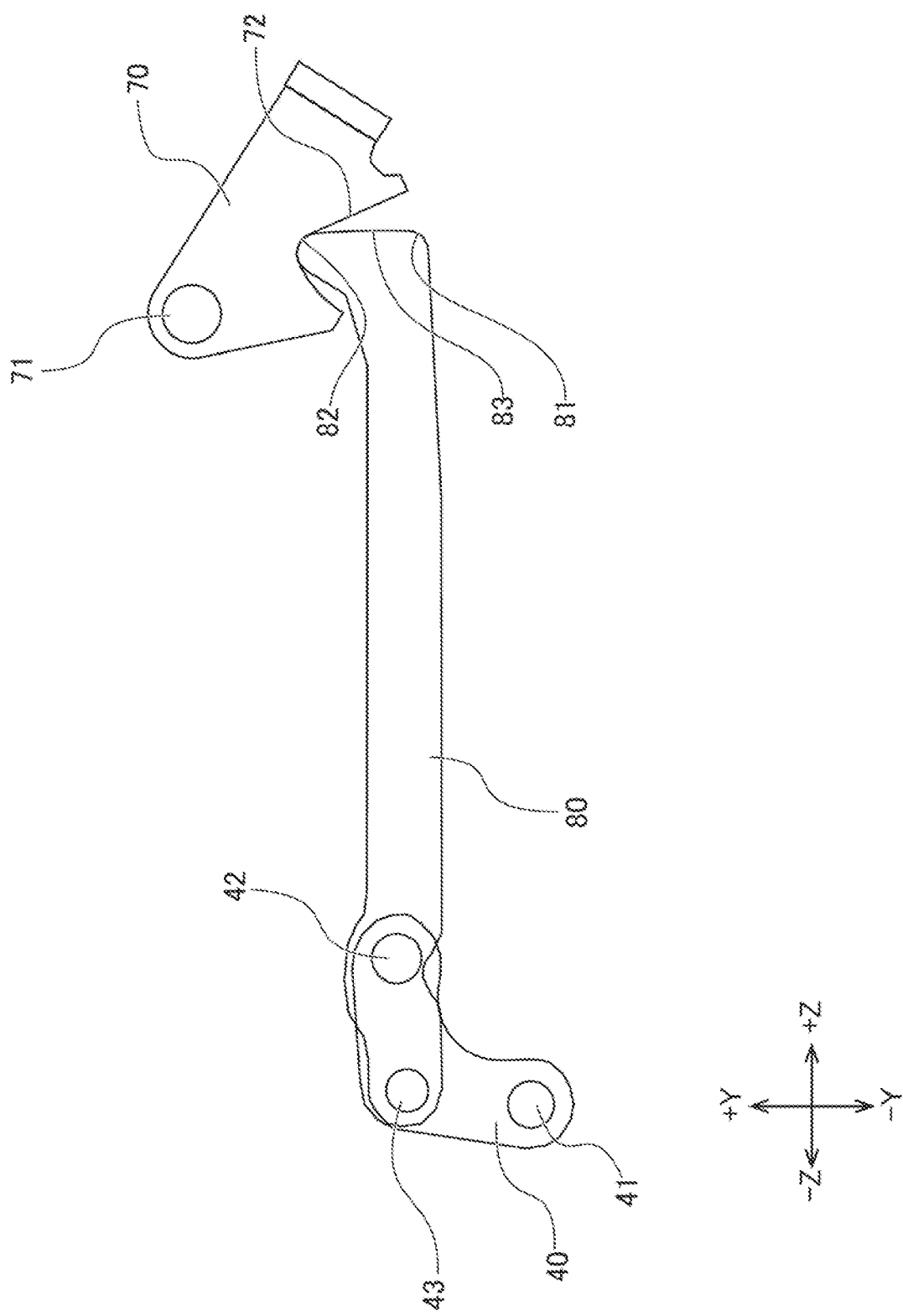
FIG. 13 is an enlarged view illustrating the first member 40, the third member 80, and the transfer member 70 in the full brake state.

FIG. 12 is a side view illustrating the movable members of the driving assistance device 1 in the full brake state. FIG. 13 is an enlarged view illustrating the first member 40, the third member 80, and the transfer member 70 in the full brake state. When the operation lever 60 is further operated substantially in the front direction (+Z direction) in the strong brake state, the operation lever 60, the first member 40, and the second member 50 each rotate through the link mechanism thereof to achieve the full brake state illustrated in FIGS. 12 and 13. In the full brake state, the position of the first lever rotational shaft 42 of the first member 40 moves further toward the front side (+Z direction) of the vehicle than in the strong brake state, and accordingly, the position of the third member 80 moves further toward the front side (+Z direction) of the vehicle than in the strong brake state, as well. As a result, the second contact part 82 of the third member 80 further pushes the input part 72 of the transfer member 70 toward the front side (+Z direction) of the vehicle. With this pushing force, the transfer member 70 rotates leftward in FIGS. 12 and 13 and pushes the brake pedal 20, and accordingly, full braking at maximum strength is actuated. When a hand is removed off the operation lever 60 during a brake operation, all members including the operation lever 60 are automatically restored to the neutral state by restoring force of the brake pedal 20.

(Full Acceleration State)

Figure 14:
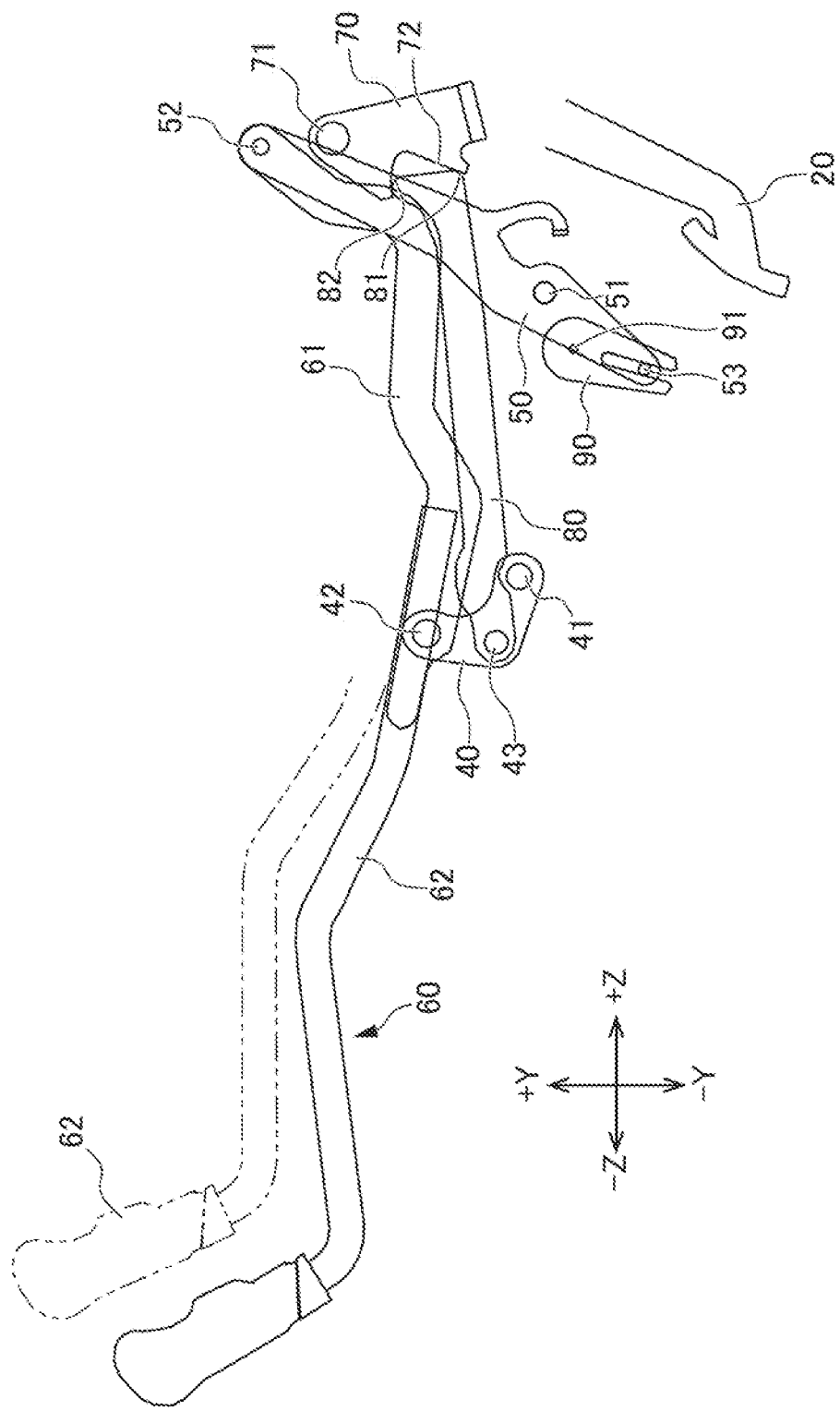
FIG. 14 is a side view illustrating the movable members of the driving assistance device 1 in a full acceleration state.

With the driving assistance device 1, an acceleration operation is performed when the operation lever 60 is operated substantially in the rear direction (−Z direction). The driving assistance device 1 of the present embodiment is not connected to the acceleration pedal 30 and does not physically push the acceleration pedal 30 in an acceleration operation. FIG. 14 is a side view illustrating the movable members of the driving assistance device 1 in the full acceleration state. The following describes an example of the full acceleration state but the same description is applicable to light and intermediate acceleration states. When the operation lever 60 is operated substantially in the rear direction (−Z direction) in an acceleration operation, the acceleration sensor part 90 rotates about the rotational shaft 91 since the acceleration sensor part 90 is engaged with the acceleration operation part 53 of the second member 50. The rotational position of the rotational shaft 91 of the acceleration sensor part 90 is read by, for example, a rotary encoder in the acceleration sensor part 90.

When an acceleration operation is performed, the rotational position of the rotational shaft 91 of the acceleration sensor part 90 is detected and an operation amount in accordance with the detected position is transferred as an acceleration operation amount to the control unit of the vehicle, and accordingly, operation to open acceleration is performed. Thus, in the present embodiment, the acceleration sensor part 90 is a drive force generator (generator) that generates drive force. Although the rotational shaft 91 of the acceleration sensor part 90 rotates in a brake operation as well, an operation amount in accordance with the rotational position of the rotational shaft 91 in the brake operation is not handled as the acceleration operation amount. For example, a biasing member such as a tensile coil spring is directly or indirectly connected to the acceleration sensor part 90 or any other movable member that is actuated in an acceleration operation, and biasing force in accordance with the acceleration operation amount is applied to an acceleration detection member or any other movable member that is actuated in an acceleration operation. With this configuration, the driver can feel increase of force necessary for an operation in accordance with increase of an operation amount by which the operation lever 60 is operated toward an acceleration operation side (substantially in the rear direction (−Z direction)). When a hand is removed off the operation lever 60 in an acceleration operation, all members including the operation lever 60 are automatically restored to the neutral state by the effect of the biasing member. The position of the brake pedal 20 in an acceleration operation is the same as in the neutral state.

Figure 15:
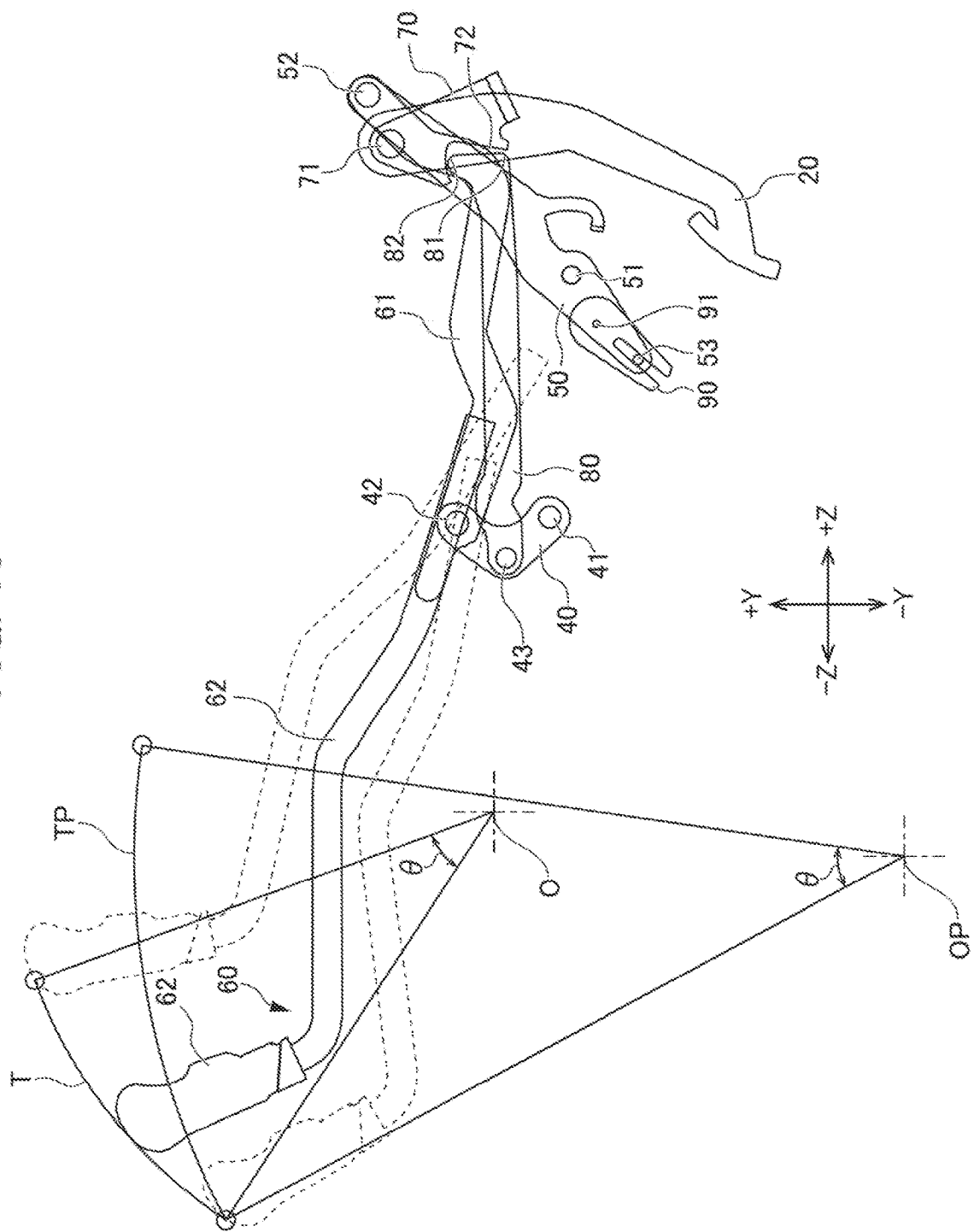
FIG. 15 is a diagram illustrating an actuation locus of an operation lever 60 of the driving assistance device 1 of the present embodiment in comparison with that in a conventional case.
Figure 16:
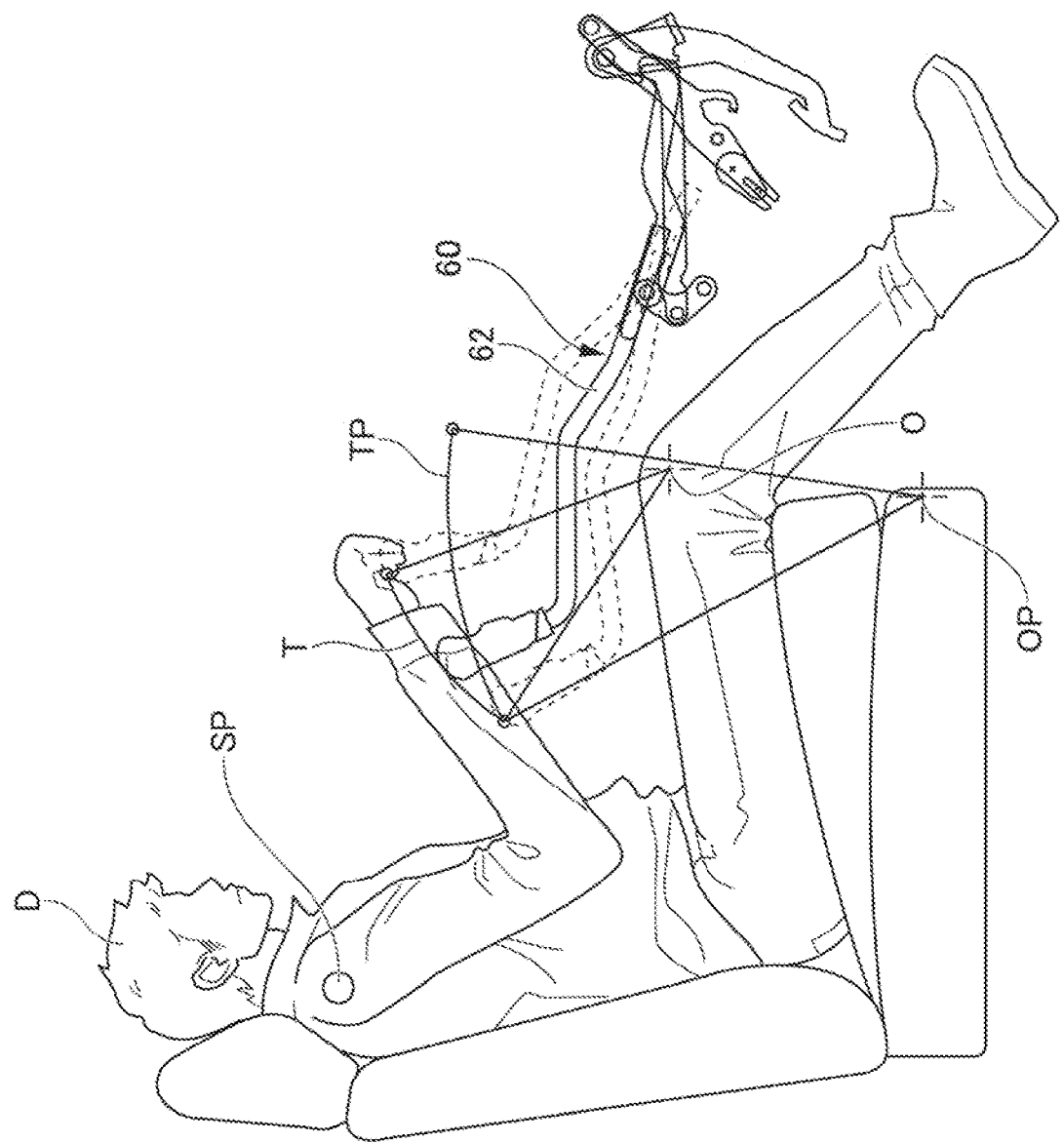
FIG. 16 is a diagram illustrating a status of an operation by a driver together with actuation loci T and TP illustrated in FIG. 15.

With the driving assistance device 1 of the present embodiment described above, an excellent effect can be obtained by characteristic disposition of the link mechanism constituted by the first member 40, the second member 50, and the third member 80, which operate simultaneously with operation of the operation lever 60. This effect will be described below. FIG. 15 is a diagram illustrating an actuation locus of the operation lever 60 of the driving assistance device 1 of the present embodiment in comparison with that in a conventional case. FIG. 16 is a diagram illustrating a status of an operation by the driver together with actuation loci T and TP illustrated in FIG. 15. In the driving assistance device 1 of the present embodiment, the first member 40 and the second member 50 are supported by the base part 10 provided near the floor of the vehicle. The third member 80 extends from the first member 40 toward the front side (+Z side) of the vehicle. The operation lever body part 61 of the operation lever 60 extends between the first member 40 and the second member 50. In this manner, these main components of the driving assistance device 1 are disposed near the front side of the feet of the driver. The extension part 62 of the operation lever 60 extends from the first lever rotational shaft 42 toward the rear side (−Z side) of the vehicle.

With this configuration, in the driving assistance device 1 of the present embodiment, an apparent virtual rotation center O of the grasping part 63 of the operation lever 60 is located at a position that is on the front and lower sides of the grasping part 63 and higher than the floor of the vehicle. FIG. 15 illustrates the actuation locus T of the grasping part 63 of the driving assistance device 1 of the present embodiment. In a case of a configuration in which an operation lever is supported on the floor between the driver seat and the front passenger seat as disclosed in Japanese Patent Laid-open No. 9-39600 (Patent Document 1), an apparent virtual rotation center OP of a grasping part of the operation lever is positioned on the floor. FIG. 15 illustrates the actuation locus TP of the grasping part of this conventional driving assistance device. The conventional actuation locus TP is a locus in a case where an actuation range of the same actuation angle θ as the actuation locus T of the grasping part 63 of the driving assistance device 1 of the present embodiment is provided.

As understood from FIG. 15, the conventional actuation locus TP is substantially aligned with the front-rear direction (Z direction) of the vehicle, but the actuation locus T of the present embodiment has a larger movement component in the up-down direction (Y direction) of the vehicle and thus has a smaller amount of movement in the front-rear direction (Z direction). In a case where the loci have actuation ranges of the same actuation angle θ, a difference in the amount of movement in the front-rear direction (Z direction) is more significant and the actuation locus T of the present embodiment has a smaller amount of movement in the front-rear direction (Z direction) than the conventional actuation locus TP. Thus, the driver does not need to push the operation lever far as compared to the conventional case in the operation of pushing the operation lever toward the front side of the vehicle, and a shoulder position (shoulder point SP) is not separated from the driver seat with extension of an arm of the driver. Accordingly, the driver can keep sitting in a driving posture with the upper body pushed against the driver seat, which is performed in a case where the driver has disability at the lower body, and can avoid difficulty in posture holding due to separation of the shoulder position from the driver seat. Moreover, in the driving assistance device 1 of the present embodiment, since the apparent virtual rotation center O of the grasping part 63 of the operation lever 60 is positioned close to the grasping part 63 as illustrated in FIG. 15, it is possible to ensure the same actuation range of the actuation angle θ as in the conventional case as well as the effect of preventing separation of the above-described shoulder position from the driver seat. Thus, with the driving assistance device 1 of the present embodiment, the operation range does not need to be reduced and the amount of an operation and fine adjustment of an operation can be easily optimized.

As illustrated in FIG. 16, main components of the driving assistance device 1 of the present embodiment are disposed near the front side of the feet of a driver D. The extension part 62 of the operation lever 60 extends from the first lever rotational shaft 42 toward the rear side (−Z side) of the vehicle. Thus, the driver D can easily perform, without hitting the operation lever 60 or the like with a foot, side walk-through that is movement from the driver seat side to the front passenger seat side and from the front passenger seat side to the driver seat side. It is assumed that a wheelchair or the like is used outside the vehicle in a case where the driver has disability at the lower body, and transfer to and from the wheelchair on the driver seat side is potentially dangerous depending on the parking position of the vehicle. However, with the driving assistance device 1 of the present embodiment, side walk-through can be easily performed in such a case as well, and convenience and safety can be significantly improved.

Modifications

Figure 17:
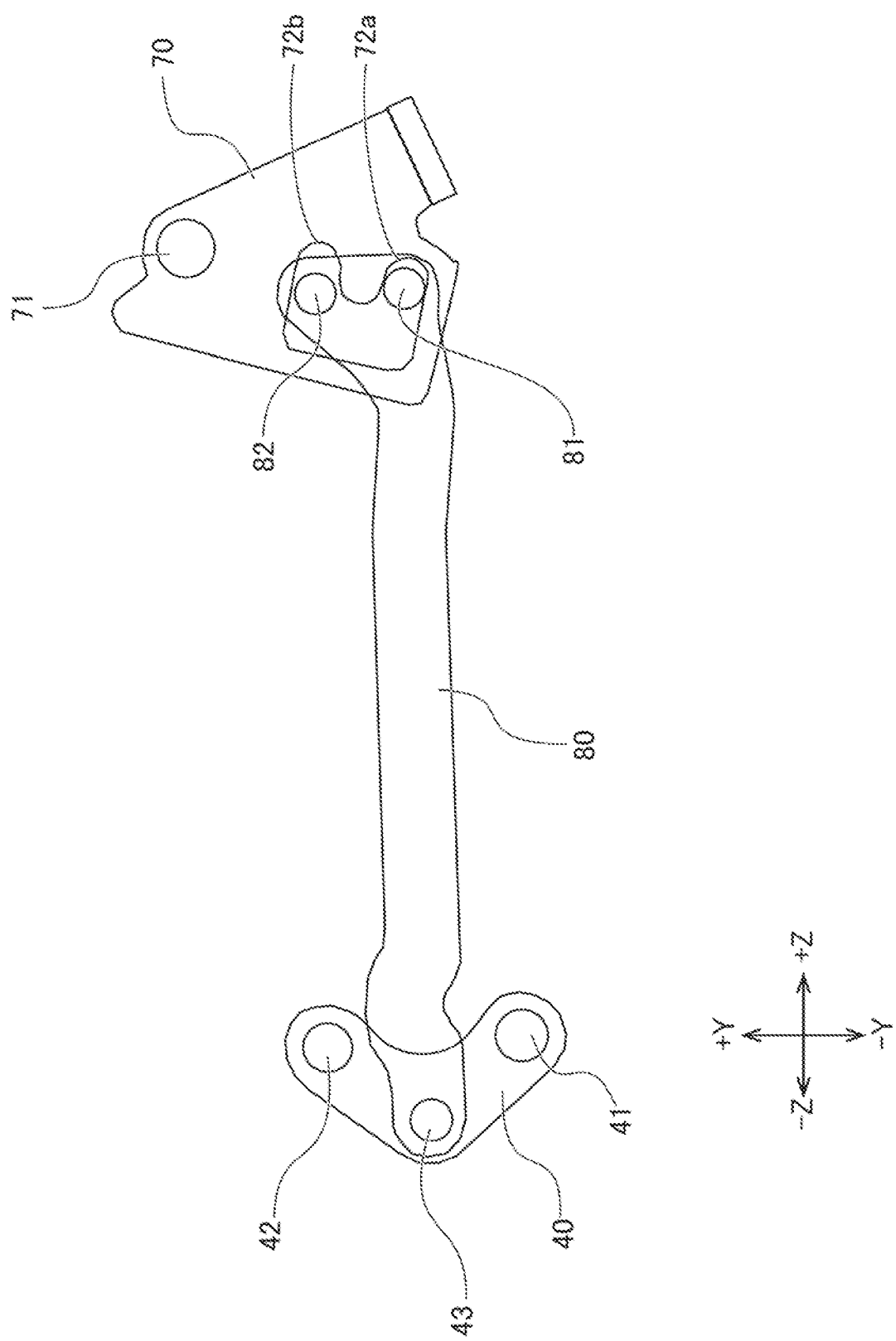
FIG. 17 is a diagram illustrating a modification of a site where the third member 80 and the transfer member 70 come into contact with each other.

Various kinds of modifications and changes are possible without limitation to the above-described embodiment and are included in the scope of the present disclosure.
(1) In the above-described example of the embodiment, the driving assistance device 1 is not connected to the acceleration pedal 30 and the acceleration pedal 30 is not physically pushed in an acceleration operation. However, the present disclosure is not limited thereto, and for example, a configuration with which the acceleration pedal 30 is physically pushed may be further provided for an acceleration operation as well. In this case, the acceleration pedal 30 is a drive force generator (generator) that generates drive force.
(2) In the above-described example of the embodiment, the third member 80 includes the first contact part 81, the second contact part 82, and the curved surface part 83 and the input part 72 of the transfer member 70 has a flat surface. However, the present disclosure is not limited thereto, and the form of a site where the third member 80 and the transfer member 70 come into contact with each other may be changed as appropriate. FIG. 17 is a diagram illustrating a modification of the site where the third member 80 and the transfer member 70 come into contact with each other. For example, the site where the third member 80 and the transfer member 70 come into contact with each other may have a form as illustrated in FIG. 17. In the example illustrated in FIG. 17, the first contact part 81 and the second contact part 82 are each formed as a cylindrical protrusion. The transfer member 70 is provided with input parts 72a and 72b corresponding to the first contact part 81 and the second contact part 82, respectively. The input parts 72a and 72b are formed in groove shapes corresponding to the first contact part 81 and the second contact part 82, respectively, as illustrated in FIG. 17.
(3) In the above-described example of the embodiment, the brake pedal 20 is physically pushed in the driving assistance device 1. However, the present disclosure is not limited thereto, and for example, the acceleration pedal 30 may be physically pushed and the brake pedal 20 may not be physically pushed. In this case, a brake sensor part that detects the amount of a brake operation by the operation lever 60 is provided as a braking force generator, and the amount detected by the brake sensor part is transferred as a brake operation amount to the control unit of the vehicle to perform a brake operation. Moreover, an acceleration operation and a brake operation by the operation lever 60 may be detected by sensors (acceleration sensors and brake sensors) as generators (drive force generator and braking force generator) to perform acceleration and braking.

The embodiment and modifications may be applied in combination as appropriate, but detailed description thereof is omitted. The present disclosure is not limited by each above-described embodiment.

EXPLANATION OF REFERENCE NUMERALS

1 driving assistance device
10 base part
11 partition member
12 support member
12a fastening member
13 pedal support member
14 pedal shaft
20 brake pedal
21 arm part
30 acceleration pedal
31 pedal side acceleration sensor part
40 first member
41 first member rotational shaft
42 first lever rotational shaft
43 third lever rotational shaft
50 second member
51 second member rotational shaft
52 second lever rotational shaft
53 acceleration operation part
60 operation lever
61 operation lever body part
62 extension part
63 grasping part
64 fastening member
70 transfer member
71 transfer rotational shaft 72 input part
72a input part
72b input part
73 pedal pushing part
80 third member
81 first contact part
82 second contact part
83 curved surface part
90 acceleration sensor part
91 rotational shaft

What is claimed is:

1. A driving assistance device comprising:
a first member rotatably supported by a first member rotational shaft;
a second member rotatably supported by a second member rotational shaft;
an operation lever rotatably supported by both a first lever rotational shaft and a second lever rotational shaft, the first lever rotational shaft being provided at the first member, the second lever rotational shaft being provided at the second member and disposed toward a front side of a vehicle relative to the first lever rotational shaft, the operation lever including an extension part extending from the first lever rotational shaft toward a rear side of the vehicle; and
a transfer member that drives a generator that generates at least one of braking force or drive force for the vehicle in accordance with an operation of the operation lever,
wherein the first member rotational shaft and the second member rotational shaft are directly connected to a same member extending along a front and rear direction of the vehicle.

2. The driving assistance device according to claim 1, wherein
the generator is at least one selected from an acceleration pedal, an acceleration sensor, a brake pedal, and a brake sensor.

3. The driving assistance device according to claim 2, wherein
the transfer member includes a first transfer member that drives a braking force generator that generates the braking force, and a second transfer member that drives a drive force generator that generates the drive force, and
the first transfer member is rotatably supported by a transfer rotational shaft, and the second transfer member is the second member that drives an acceleration sensor part.

4. The driving assistance device according to claim 3, further comprising
a third member rotatably supported by a third lever rotational shaft provided at the first member, the third member configured to come into contact with the first transfer member.

5. The driving assistance device according to claim 4, wherein
the third member includes
a first contact part that comes into contact with the first transfer member when the operation lever is operated by an operation amount equal to or smaller than a first operation amount, and
a second contact part that comes into contact with the first transfer member when the operation lever is operated by an operation amount larger than the first operation amount, and
the second contact part is disposed at a position closer to the transfer rotational shaft than the first contact part.

6. The driving assistance device according to claim 1, wherein
the generator is at least one selected from an acceleration pedal, an acceleration sensor, a brake pedal, and a brake sensor.

* * * * *